(12) United States Patent
Yoshida

(10) Patent No.: US 8,223,310 B2
(45) Date of Patent: Jul. 17, 2012

(54) LIQUID CRYSTAL DEVICE, METHOD OF MANUFACTURING LIQUID CRYSTAL DEVICE AND ELECTRONIC APPARATUS

(75) Inventor: Shuhei Yoshida, Tottori (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 12/336,015

(22) Filed: Dec. 16, 2008

(65) Prior Publication Data

US 2009/0213316 A1 Aug. 27, 2009

(30) Foreign Application Priority Data

Feb. 27, 2008 (JP) ................. 2008-045600

(51) Int. Cl.
*G02F 1/1339* (2006.01)
(52) U.S. Cl. ...................... 349/155; 349/156
(58) Field of Classification Search ........... 349/155–156
See application file for complete search history.

(56) References Cited

U.S. PATENT DOCUMENTS

2007/0002263 A1* 1/2007 Kim et al. .................... 349/156
2008/0074594 A1* 3/2008 Tanabe et al. ................ 349/114

FOREIGN PATENT DOCUMENTS

| JP | A-2002-014363 | 1/2002 |
| JP | A-2002-244158 | 8/2002 |
| JP | A-2003-084289 | 3/2003 |
| JP | A-2006-330470 | 12/2006 |
| JP | B2-3925142 | 6/2007 |

\* cited by examiner

*Primary Examiner* — Phu Vu
(74) *Attorney, Agent, or Firm* — K&L Gates LLP

(57) ABSTRACT

Provided is a liquid crystal device including a first substrate and a second substrate which face each other with a liquid crystal layer interposed therebetween, wherein a plurality of columnar spacers for maintaining a gap between the first substrate and the second substrate is arranged on a surface of a liquid crystal layer side of the first surface, and spacer reception portions are arranged on a surface of a liquid crystal layer side of the second substrate in regions which face the columnar spacers, and wherein the spacer reception portions include contact reception portions which are in contact with the columnar spacers and non-contact reception portions which are not in contact with the columnar spacers.

4 Claims, 4 Drawing Sheets

LIQUID CRYSTAL DEVICE, METHOD OF MANUFACTURING LIQUID CRYSTAL DEVICE AND ELECTRONIC APPARATUS

BACKGROUND

1. Technical Field

The present invention relates to a liquid crystal device, a method of manufacturing the liquid crystal device and an electronic apparatus and more particularly, a liquid crystal device in which a plurality of columnar spacers for maintaining a gap between two substrates is provided.

2. Related Art

There is a liquid crystal device (liquid crystal panel) in which a plurality of columnar spacers for maintaining a gap (cell gap) between two substrates. In such a liquid crystal panel, the strength (surface pressing strength) when external force is applied to the liquid crystal panel in a thickness direction needs to be improved and vacuum bubbles need to be prevented from being generated because the cell gap cannot be shrunk by the shrinkage of liquid crystal.

However, in order to improve the surface pressing strength, if the density of the columnar spacers is increased by increasing the number of columnar spacers, it is difficult to shrink the cell gap. Thus, vacuum bubbles are susceptible to be generated.

As a technology of solving this problem, there is a liquid crystal panel in which a cell gap is maintained by thicknesses of two stages depending on whether or not external force is applied to the liquid crystal panel in the thickness direction (for example, Japanese Patent No. 3925142, JP-A-2003-84289 and JP-A-2006-330470). In such a liquid crystal panel, when the external force is not applied to the liquid crystal panel in the thickness direction, a thick cell gap is maintained by the columnar spacers having a large height. When the force is applied to the display crystal panel in the thickness direction, the columnar spacers having the large height are deformed and the buckling of the columnar spacers having the large height is prevented by columnar spacers having a small height, thereby maintaining a small cell gap. Accordingly, if the columnar spacers having different heights are mixed in a liquid crystal layer, the surface pressing strength is higher than that of the case where the columnar spacers having the small height are not provided.

In the liquid crystal panel in which the columnar spacers having the different heights are mixed in the liquid crystal layer, when liquid crystal molecules are shrunk under a low-temperature environment, only the columnar spacers having the large height are deformed by the shrinkage of the liquid crystal. Accordingly, in such a liquid crystal panel, if the number of columnar spacers is the same, the cell gap is susceptible to be shrunk by the shrinkage of the liquid crystal compared with the liquid crystal panel in which the heights of the columnar spacers are the same. Thus, it is possible to prevent vacuum bubbles from being generated.

However, if the columnar spacers having the different heights are manufactured, a process of manufacturing the columnar spacers is complicated. Accordingly, there is a need for improvement of productivity.

In the existing liquid crystal device, the liquid crystal is dripped onto a substrate on which an annular seal material is provided without a liquid crystal injection hole, and two substrates are adhered to each other so as to form a liquid crystal layer. In this case, since the amount of liquid crystal dripped is low, the amount of liquid crystal sealed is low, and vacuum bubbles are susceptible to be generated when the pressure in the liquid crystal layer is negative pressure.

Accordingly, in the existing liquid crystal device, an optimal dripping amount range of a liquid crystal dripping at the time of forming the liquid crystal layer should narrow. Accordingly, it is difficult to improve productivity.

SUMMARY

An advantage of some aspects of the invention is that it provides a liquid crystal device capable of improving surface pressing strength without providing columnar spacers having different heights, preventing vacuum bubbles from being generated because a cell gap cannot be shrunk by the shrinkage of liquid crystal, and widening an optimal dripping amount range of a liquid crystal dripping at the time of forming a liquid crystal layer, and an electronic apparatus including the same.

Another advantage of some aspects of the invention is that it provides a method of manufacturing a liquid crystal device capable of improving surface pressing strength, preventing vacuum bubbles from being generated, and widening an optimal dripping amount range of a liquid crystal dripping at the time of forming a liquid crystal layer.

According to an aspect of the invention, there is provided a liquid crystal device including a first substrate and a second substrate which face each other with a liquid crystal layer interposed therebetween, wherein a plurality of columnar spacers for maintaining a gap between the first substrate and the second substrate is arranged on a surface of a liquid crystal layer side of the first surface, and spacer reception portions are arranged on a surface of a liquid crystal layer side of the second substrate in regions which face the columnar spacers, and wherein the spacer reception portions include contact reception portions which are in contact with the columnar spacers and non-contact reception portions which are not in contact with the columnar spacers.

According to the liquid crystal device of the invention, since the spacer reception portions include the contact reception portions which are in contact with the columnar spacers and the non-contact reception portions which are not in contact with the columnar spacers, the cell gap is maintained by thicknesses of two stages although the heights of the columnar spacers are the same.

That is, in the liquid crystal device of the invention, when external force is not applied to the liquid crystal device in a thickness direction, the cell gap is maintained by the columnar spacers which are in contact with the contact reception portions. Accordingly, the cell gap thickens in the regions in which the non-contact reception portions are formed. When the external force is applied to the liquid crystal device in the thickness direction, the columnar spacers which are in contact with the contact reception portions are deformed, but the columnar spacers which are not in contact with the non-contact reception portions are brought into contact with the non-contact reception portion such that the buckling of the columnar spacers which are in contact with the contact reception portions is prevented and the cell gap is maintained by the thickness corresponding to the height of the columnar spacers which are in contact with the non-contact reception portions. When the external force is removed from the liquid crystal device in the thickness direction, the deformation of the columnar spacers which are in contact with the contact reception portions is recovered and the cell gap is maintained by the columnar spacers which are in contact with the contact reception portions. In the liquid crystal device of the invention, the cell gap is maintained by thicknesses of two stages depending on whether or not the external force is applied in the thickness direction and the surface pressing strength is higher compared with the case where the non-contact reception portions are not provided.

In the liquid crystal device of the invention, when liquid crystal molecules are shrunk under a low-temperature environment, only the columnar spacers which are in contact with the contact reception portions are deformed by the shrinkage of the liquid crystal. Accordingly, in the liquid crystal device of the invention, when the number of columnar spacers is the same, the cell gap is susceptible to be shrunk by the shrinkage of the liquid crystal and vacuum bubbles can be prevented from being generated, compared with the case where the non-contact reception portions are not provided.

Accordingly, in the liquid crystal device of the invention, the surface pressing strength can be improved and the vacuum bubbles can be prevented from being generated without providing the columnar spacers having different heights.

According to the liquid crystal device of the invention, since the spacer reception portions include the contact reception portions which are in contact with the columnar spacers and the non-contact reception portions which are not in contact with the columnar spacers, the vacuum bubbles can be prevented from being generated and an optimal dripping amount range of a liquid crystal dripping at the time of forming the liquid crystal layer can widen, as described below. That is, in the liquid crystal device of the invention, when the liquid crystal dripping amount at the time of forming the liquid crystal layer is lower, only the columnar spacers which are in contact with the contact reception portions are deformed by the pressure in the liquid crystal layer and thus the cell gap is susceptible to be shrunk by the pressure in the liquid crystal layer. Accordingly, in the liquid crystal device of the invention, when the number of columnar spacers is the same, the pressure in the liquid crystal layer is unlikely to be a negative pressure compared with the case where the non-contact reception portions are not provided. Thus, the vacuum bubbles can be prevented from being generated. Accordingly, the optimal dripping amount range of the liquid crystal dripping at the time of forming the liquid crystal layer can widen and thus productivity can be improved.

In the liquid crystal device, the sum of the cross-sectional areas of the columnar spacers which face the non-contact reception portions may be larger than that of the cross-sectional areas of the columnar spacers which face the contact reception portions.

In the liquid crystal device, when liquid crystal molecules are shrunk under a low-temperature environment, the cross-sectional area of the columnar spacers which will be deformed by the shrinkage of the liquid crystal is relatively small. Accordingly, the cell gap is susceptible to be shrunk by the shrinkage of the liquid crystal and vacuum bubbles can be efficiently prevented from being generated. Since the cell gap is susceptible to be shrunk by the pressure in the liquid crystal layer, the optimal dripping amount range of the liquid crystal dripping at the time of forming the liquid crystal layer can further widen.

In the liquid crystal device, the cross-sectional areas of the columnar spacers which face the non-contact reception portions may be larger than those of the columnar spacers which face the contact reception portions.

By this liquid crystal device, although the number of non-contact reception portions is small, the surface pressing strength can be efficiently improved. Since the columnar spacers which face the contact reception portions are susceptible to be deformed, the cell gap is susceptible to be further shrunk and thus the vacuum bubbles can be more efficiently prevented from being generated.

In the liquid crystal device, the non-contact reception portions may be formed of concave portions.

In the liquid crystal device, the non-contact reception portions may include first non-contact reception portions in which the concave portions have a first depth and second non-contact reception portions in which the concave portions have a second depth which are different from the first depth.

In the liquid crystal device, although the heights of the columnar spacers are the same, the cell gap is maintained by thicknesses of three stages. Hereinafter, the case where the second depth is larger than the first depth will be described in more detail.

That is, in the liquid crystal device, when external force is applied to the liquid crystal device in the thickness direction, the columnar spacers which are not in contact with the non-contact reception portions are brought into contact with the non-contact reception portions formed of the concave portions having the first depth, and the cell gap is maintained by the thickness corresponding to the height of the columnar spacers which are in contact with the non-contact reception portions formed of the concave portions having the first depth. When stronger external force is applied to the liquid crystal device in the thickness direction, the columnar spacers which are not in contact with the non-contact reception portions formed of the concave portions having the second depth are brought into contact with the non-contact reception portions formed of the concave portions having the second depth, and the cell gap is maintained by the thickness corresponding to the height of the columnar spacers which are in contact with the non-contact reception portions formed of the concave portions having the second depth.

Accordingly, in the liquid crystal device, the surface pressing strength is higher compared with the case where the non-contact reception portions formed of the concave portions are not provided.

According to another aspect of the invention, there is provided a method of manufacturing a liquid crystal device including a first substrate and a second substrate which face each other with a liquid crystal layer interposed therebetween, the method including: forming a plurality of columnar spacers for maintaining the thickness of the liquid crystal layer on a surface of a liquid crystal layer side of the first substrate; and forming spacer reception portions on a surface of a liquid crystal layer side of the second substrate in spacer facing regions which face the columnar spacers, wherein the forming of the spacer reception portions includes forming concave portions in portions of the spacer facing regions so as to form contact reception portions which are in contact with the columnar spacers and non-contact reception portions which are formed of the concave portions and are not in contact with the columnar spacers.

According to the method of manufacturing the liquid crystal device of the invention, it is possible to manufacture the liquid crystal device of the invention which includes the contact reception portions which are in contact with the columnar spacers and the non-contact reception portions which are formed of the concave portions formed in the spacer facing regions and are not in contact with the columnar spacers and is capable of improving high surface pressing strength and preventing vacuum bubbles from being generated. In the method of manufacturing the liquid crystal device of the invention, the optimal dripping amount range of the liquid crystal dripping at the time of forming the liquid crystal layer can be widen and thus productivity can be improved.

In the method of manufacturing the liquid crystal device, the concave portions may be formed using a multi-level gradation exposure method.

In the method of manufacturing the liquid crystal device, it is possible to easily form the non-contact reception portions formed of the concave portions.

In the method of manufacturing the liquid crystal device, the second substrate may include an uneven insulating film having an uneven portion formed on the surface of the liquid crystal layer side thereof and a reflective film formed on the uneven portion, and, in the forming of the concave portions, the concave portions which become the non-contact reception portions are formed at the same time with the uneven portion of the uneven insulating film is formed.

By the method of manufacturing the liquid crystal device, it is possible to easily form the non-contact reception portions formed of the concave portions without increasing manufacturing processes, compared with the case where the non-contact reception portions formed of the concave portions are not formed.

According to another aspect of the invention, there is provided an electronic apparatus including the above-described liquid crystal device.

According to the electronic apparatus of the invention, the surface pressing strength is high, the vacuum bubbles can be prevented from being generated, and reliability is excellent because the liquid crystal device with excellent productivity is incorporated.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
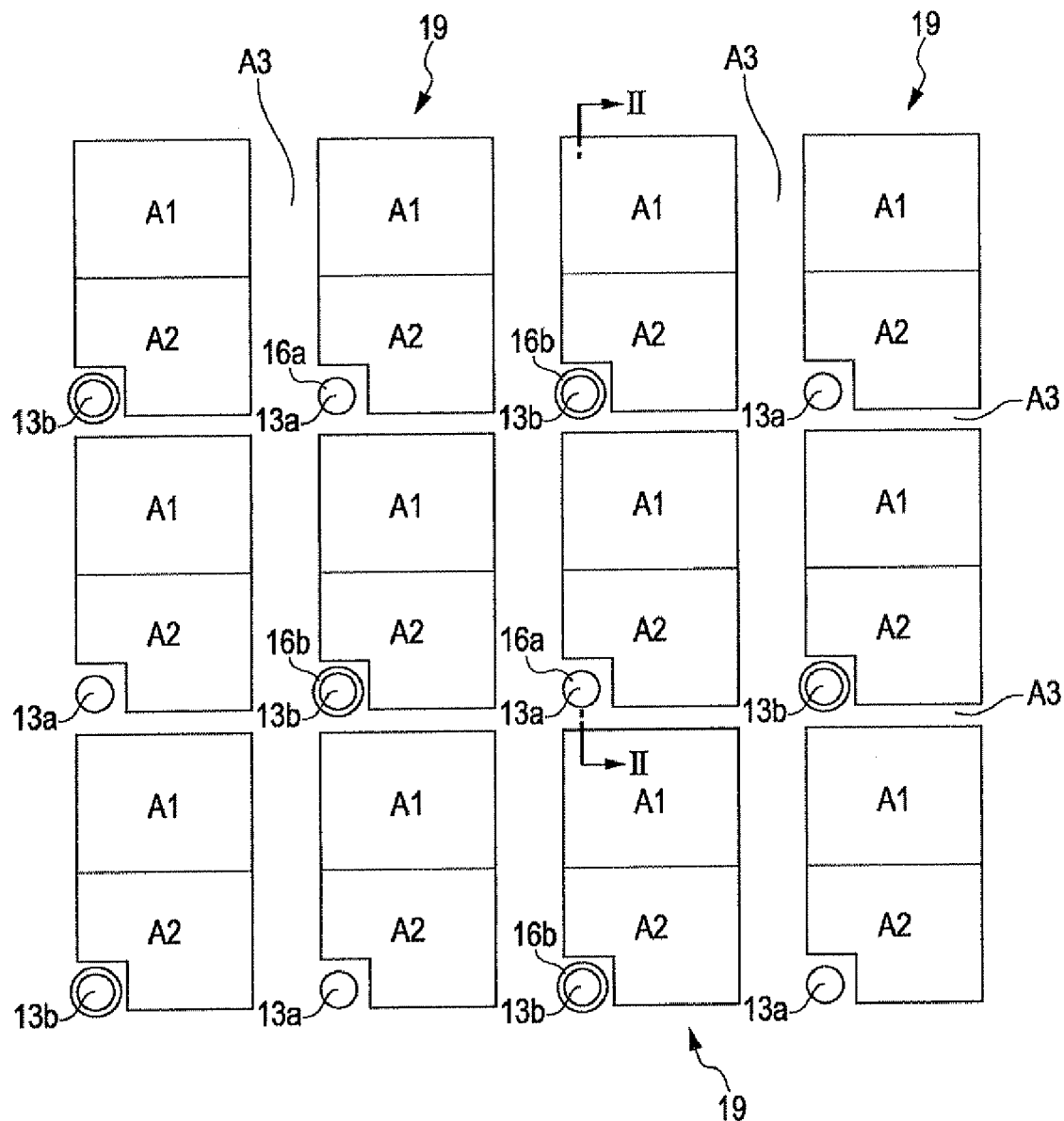
FIG. 1 is a schematic plan view showing an example of a liquid crystal device according to the invention.

Hereinafter, a liquid crystal device, a method of manufacturing the liquid crystal device and an electronic apparatus according to the invention will be described. Although various types of structures are described with respect to the drawings, the dimension of the structure shown in the drawings may be differentiated from that of an actual structure in order to recognize the characteristic portions.

First Embodiment

Figure 2:
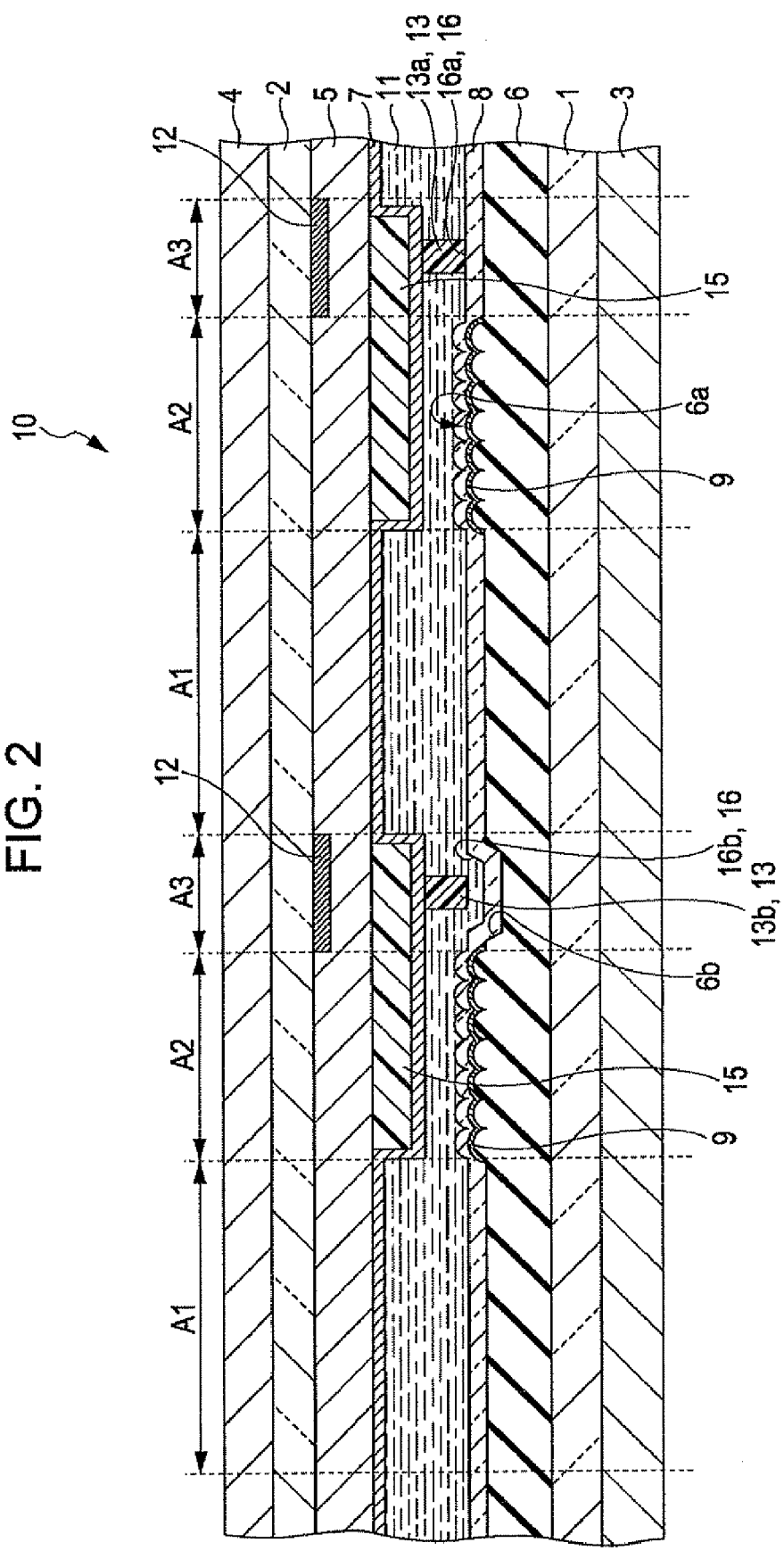
FIG. 2 is a cross-sectional view taken along line II-II of the liquid crystal device shown in FIG. 1.

Hereinafter, a liquid crystal device according to a first embodiment of the invention will be described with reference to the drawings. FIG. 1 is a schematic plan view showing an example of a liquid crystal device according to the invention. FIG. 2 is a cross-sectional view taken along line II-II of the liquid crystal device shown in FIG. 1. In FIG. 1, in order to make the drawing clear, only columnar spacers 13a and 13b, non-contact reception portions 16b, a transmissive region A1, a reflective region A2, a none display region A3, and a pixel region 19 are shown.

The liquid crystal device 10 shown in FIGS. 1 and 2 is a transflective color liquid crystal device. As shown in FIG. 2, the liquid crystal device 10 includes a device substrate 1 (second substrate) and a counter substrate 2 (first substrate) which face each other with a liquid crystal layer 11 interposed therebetween. The liquid crystal layer 11 is sealed between the device substrate 1 and the counter substrate 2 by a seal material (not shown) provided on the edge of a region where the device substrate 1 and the counter substrate 2 face each other. A backlight (not shown) including a light guide plate and a reflective plate is provided on an outer surface (a lower surface in the drawing) of the device substrate 1.

In FIGS. 1 and 2, a reference numeral A1 denotes a transmissive region in which light transmitted from the backlight to the liquid crystal layer 11 is modulated so as to perform a display, A2 denotes a reflective region in which light transmitted from the outside of the counter substrate 2 to the liquid crystal layer 11 is reflected and modulated so as to perform a display, and A3 denotes a none display region. In FIG. 1, a reference numeral 19 is a pixel region which is a display region of a minimum unit configuring the display.

The device substrate 1 shown in FIG. 2 is formed of a light transmission material such as glass, quartz or plastic. An insulating film (uneven insulating film) 6 formed of positive photosensitive resin is formed on the device substrate 1. Uneven portions 6a defining an uneven shape of a reflective film 9 and concave portions 6b having a circular shape in plan view and defining a concave shape of the non-contact reception portions 16b are formed in the surface of the liquid crystal layer 11 side of the insulating film 6. As shown in FIG. 2, each of the uneven portions 6a is formed over the entire region of the reflective region A2. Each of the concave portions 6b is formed in the non-display region A3. A material configuring the insulating film 6 is not specially limited. It is preferable that the insulating film 6 is formed of the positive photosensitive resin, because the uneven portions 6a or the concave portions 6b can be easily formed with high precision compared with the case where the insulating film 6 is formed of negative photosensitive resin.

On the uneven portions 6a of the insulating film 6, the reflective film 9, which is formed of a metal film having light reflectivity such as aluminum or silver, or/and a dielectric lamination film (dielectric mirror) obtained by laminating dielectric films having different refractive indexes such as $SiO_2$ and $TiO_2$, is formed so as to cover the uneven portions 6a. Since the device substrate 1 includes the reflective film 9 having the uneven shape, the reflected light of the reflective film 9 can be diffused and thus visibility of a reflective display can be improved.

On the insulating film 6 and the reflective film 9, a pixel electrode 8 formed of a transparent conductive material such as indium tin oxide (ITO) is formed. As the pixel electrode 8, an electrode arranged in correspondence with the transmissive region A1 and an electrode arranged in correspondence with the reflective region A2 may be electrically connected to each other in a boundary between the transmissive region A1 and the reflective region A2. In this case, for example, since an electrode formed of a transparent conductive material can be formed in the transmissive region A1 and an electrode formed of a metallic material having light reflectivity can be formed in the reflective region A2, the electrode formed in the reflective region A2 may function as the reflective film.

An alignment film (not shown) formed of polyimide or silicon oxide is formed on the pixel electrode 8. A polarizer film 3 is formed on an outer surface (a lower surface in the drawing) of the device substrate 1.

Meanwhile, the counter substrate 2 is formed of a light transmission material such as glass, quartz or plastic. As shown in FIG. 2, a black matrix 12 formed of a light-shielding material is formed in the non-display region A3 of the surface of the inner side (the liquid crystal layer 11 side) of the counter substrate 2. A color filter 5 is formed on the surface of the inner side of the counter substrate 2 on which the black matrix 12 is formed. A liquid crystal layer thickness adjustment layer 15 formed of acryl is formed in a region including the reflective region A2 and a portion of the non-display region A3 of the surface of the inner side of the color filter 5. The liquid crystal layer thickness adjustment layer 15 is used for forming a multi-gap structure. By providing the liquid crystal layer thickness adjustment layer 15, a layer thickness (cell gap) of the liquid crystal layer 11 in the reflective region A2 becomes about a half of the cell gap in the transmissive region A1 such that the retardations of the liquid crystal layer 11 in the reflective region A2 and the transmissive region A1 become substantially equal to each other, thereby obtaining a uniform image display in the reflective region A2 and the transmissive region A1.

A common electrode 7 formed of a transparent conductive material such as ITO is formed on the surface of the inner side of the color filter 5 and the liquid crystal layer thickness adjustment layer 15. An alignment film (not shown) formed of a polyimide or silicon oxide is formed on the common electrode 7.

A polarizer film 4 is formed on an outer surface (an upper surface in the drawing) of the counter substrate 2.

In the liquid crystal device 10 of the present embodiment, a plurality of columnar spacers 13 for maintaining the thickness of the liquid crystal layer 11 which is a gap between the array substrate 1 and the counter substrate 2 is arranged in the non-display region A3 in which the liquid crystal layer thickness adjustment layer 15 is formed on the surface of the liquid crystal layer 11 side of the counter substrate 2, as shown in FIGS. 1 and 2. The columnar spacers 13 are formed of negative photosensitive resin such as photosensitive acrylic resin, have the same height and have a circular shape in cross-sectional view.

As shown in FIG. 2, spacer reception portions 16 are arranged in spacer facing regions which face the columnar spacers 13 on the surface of the liquid crystal layer 11 side of the device substrate 1. In the liquid crystal device 10 of the present embodiment, as shown in FIG. 1, each of the columnar spacers 13 and each of the spacer reception portions 16 are provided in one pixel region 19 one by one.

As shown in FIG. 2, each of the spacer reception portions 16 includes a contact reception portion 16a which are in contact with each of the columnar spacers 13 and a non-contact reception portion 16b which is not in contact with each of the columnar spacers 13. As shown in FIG. 2, each of the contact reception portions 16a is a flat portion where the pixel electrode 8 and the alignment film are sequentially formed on the flat insulating film 6. As shown in FIG. 2, each of the non-contact reception portions 16b is a concave portion where the pixel electrode 8 and the alignment film are sequentially formed on the concave portion 6b of the insulating film 6.

Each of the concave portions configuring the non-contact reception portions 16b has a circular shape in plan view, of which the appearance is gradually decreased from the edge from the bottom. The depth of each of the concave portions may be determined by the material of the columnar spacers 13 or the thickness of the cell gap and is preferably, but not specially limited to, 0.2 to 1 μm. As shown in FIG. 2, the depth of the concave portion is equal to the distance between each of the columnar spacers 13b (each of the columnar spacers 13b facing the non-contact reception portions 16b) and each of the non-contact reception portions 16b. Accordingly, when external force is applied to the liquid crystal device 10 in a thickness direction such that the non-contact reception portions 16b are brought into contact with the columnar spacers 13b, the thickness of the cell gap is decreased by the depth of each of the concave portions.

In the liquid crystal device 10 of the present embodiment, as shown in FIG. 1, the contact reception portions 16a and the non-contact reception portions 16b are alternately arranged in a checkerboard pattern. Accordingly, a ratio of the contact reception portions 16a and the non-contact reception portions 16b in the spacer reception portions 16 is the same. The density of the contact reception portions 16a or the density of the non-contact reception portions 16b are, although not limited to, preferably uniform such that a uniform surface pressing strength can be obtained.

Method of Manufacturing Liquid Crystal Device

The liquid crystal device 10 of the present embodiment may be, for example, manufactured by the following method. In the following description, the process of manufacturing the spacer reception portions 16 will be described in detail and the description of the other processes will be omitted or simplified. The known method may be employed with respect to the other processes except the process of manufacturing the spacer reception portions 16.

First, the black matrix 12 is formed in the non-display region A3 on the surface of the liquid crystal layer 11 side of the counter substrate 2. Next, the color filter 5 is formed on the surface of the liquid crystal layer 11 side of the counter substrate 2 on which the black matrix 12 is formed, and the liquid crystal layer thickness adjustment layer 15 is formed on the color filter 5 in a portion of the non-display region A3 and the reflective region A2. Subsequently, the common electrode 7 is formed on the color filter 5 and the liquid crystal layer thickness adjustment layer 15, and the alignment film (not shown) is formed on the common electrode 7. In addition, the columnar spacers 13 are formed on the liquid crystal layer thickness adjustment layer 15, on which the common electrode 7 is formed, in the non-display region A3.

The polarizer film 4 is formed on the surface opposite to the color filter 5 of the counter substrate 2.

First, the insulating film formed of the positive photosensitive resin is formed on the device substrate 1, and the uneven portions 6a defining the uneven shape of the reflective film 9 and the concave portions 6b defining the shape of the non-contact reception portions 16b are simultaneously formed by a multi-level gradation exposure method using a multi-level gradation exposure mask so as to form the insulating film 6. At this time, as shown in FIG. 2, the concave portions 6b are formed in the spacer facing regions which face the columnar spacers 13 and the uneven portions 6a are formed in the reflective region A2.

Subsequently, the reflective film 9 is formed on the uneven portions 6a of the insulating film 6, the pixel electrode 8 is formed on the insulating film 6 and the reflective film 9, and the alignment film (not shown) is formed on the pixel electrode 8. As shown in FIG. 2, the contact reception portions 16a where the pixel electrode 8 and the alignment film are sequentially formed are formed on the flat insulating film 6 and the non-contact reception portions 16b where the pixel electrode 8 and the alignment film are sequentially formed are formed on the concave portions 6b of the insulating film 6.

The polarizer film 3 is formed on the outer surface (the lower surface in the drawing) of the device substrate 1.

Thereafter, the annular seal material (not shown) is provided on the device substrate 1 or the counter substrate 2 and liquid crystal is dripped on the substrate on which the seal material is provided. Subsequently, the contact reception portions 16a or the non-contact reception portions 16b and the columnar spacers 13 face each other, the device substrate 1 and the counter substrate 2 are adhered to each other using the seal material, and the liquid crystal is sealed between the device substrate 1 and the counter substrate 2 so as to form the liquid crystal layer 11. In the present embodiment, since the non-contact reception portions 16b which are the concave portions are formed in the surface of the liquid crystal layer 11 side of the device substrate 1, the cell gap is susceptible to be shrunk by the pressure in the liquid crystal layer 11. Accordingly, an optimal dripping amount range of a liquid crystal dripping at the time of forming the liquid crystal layer 11 can widen.

By the above-described process, the liquid crystal device 10 shown in FIGS. 1 and 2 can be obtained.

In the liquid crystal device 10 of the present embodiment, since the plurality of columnar spacers 13 are arranged on the surface of the liquid crystal layer 11 side of the counter substrate 2, the spacer reception portions 16 are arranged in the regions which face the columnar spacers 13 on the surface of the liquid crystal layer 11 side of the device substrate 1, and each of the spacer reception portions 16 include the contact reception portion 16a which is in contact with each of the columnar spacers 13a and the non-contact reception portion 16b of the concave portions which is not in contact with each of the columnar spacers 13b, the cell gap is maintained by the thicknesses of two stages although the heights of the columnar spacers 13a and 13b are the same.

Accordingly, in the liquid crystal device 10 of the present embodiment, it is possible to improve the surface pressing strength and prevent vacuum bubbles from being generated without providing the columnar spacers having different heights. In addition, in the liquid crystal device 10 of the present embodiment, since the cell gap is susceptible to be shrunk by the pressure in the liquid crystal layer 11, the optimal dripping amount of the liquid crystal dripping at the time of forming the liquid crystal layer 11 can widen compared with the case where the non-contact reception portions 16b are not provided and thus productivity can be improved.

In the liquid crystal device 10 of the present embodiment, since the columnar spacers 13 are arranged on the surface of the liquid crystal layer 11 side of the counter substrate 2 in the region where the liquid crystal layer thickness adjustment layer 15 is formed, the height of the columnar spacers 13 can be halved compared with the case where the columnar spacers 13 are formed in the region where the liquid crystal layer thickness adjustment layer 15 is not formed. In addition, the buckling strength of the columnar spacers 13 can be improved and the columnar spacers 13 can be readily formed.

In the liquid crystal device 10 of the present embodiment, since the columnar spacers 13 are arranged on the surface of the liquid crystal layer 11 side of the counter substrate 2 in the non-display region A3, a numerical aperture of the display area is not lowered by the providing the columnar spacers 13.

In the liquid crystal device 10 of the present embodiment, since the device substrate 1 includes the insulating film 6 having the uneven portion 6a on the surface of the liquid crystal layer 11 side and the reflective film 9 formed on the uneven portion 6a of the insulating film 6, and the concave portions 6b of the insulating film 6 which become the non-contact reception portions 16b and the uneven portions 6a of the insulating film 6 are simultaneously formed in the process of forming the concave portions which become the non-contact reception portions 16b when the liquid crystal display device 10 is manufactured, it is possible to easily and efficiently form the non-contact reception portions 16b formed of the concave portions without increasing the manufacturing processes, compared with the case where the non-contact reception portions 16b formed of the concave portions are not formed.

In the method of manufacturing the liquid crystal device 10 of the present embodiment, since the uneven portion 6a of the insulating film 6 defining the uneven shape of the reflective film 9 and the concave portions 6b of the insulating film 6 defining the shape of the non-contact reception portions 16b are simultaneously formed using the multi-level gradation exposure method, it is possible to easily form the non-contact reception portions 16b formed of the concave portions.

Second Embodiment

Figure 3:
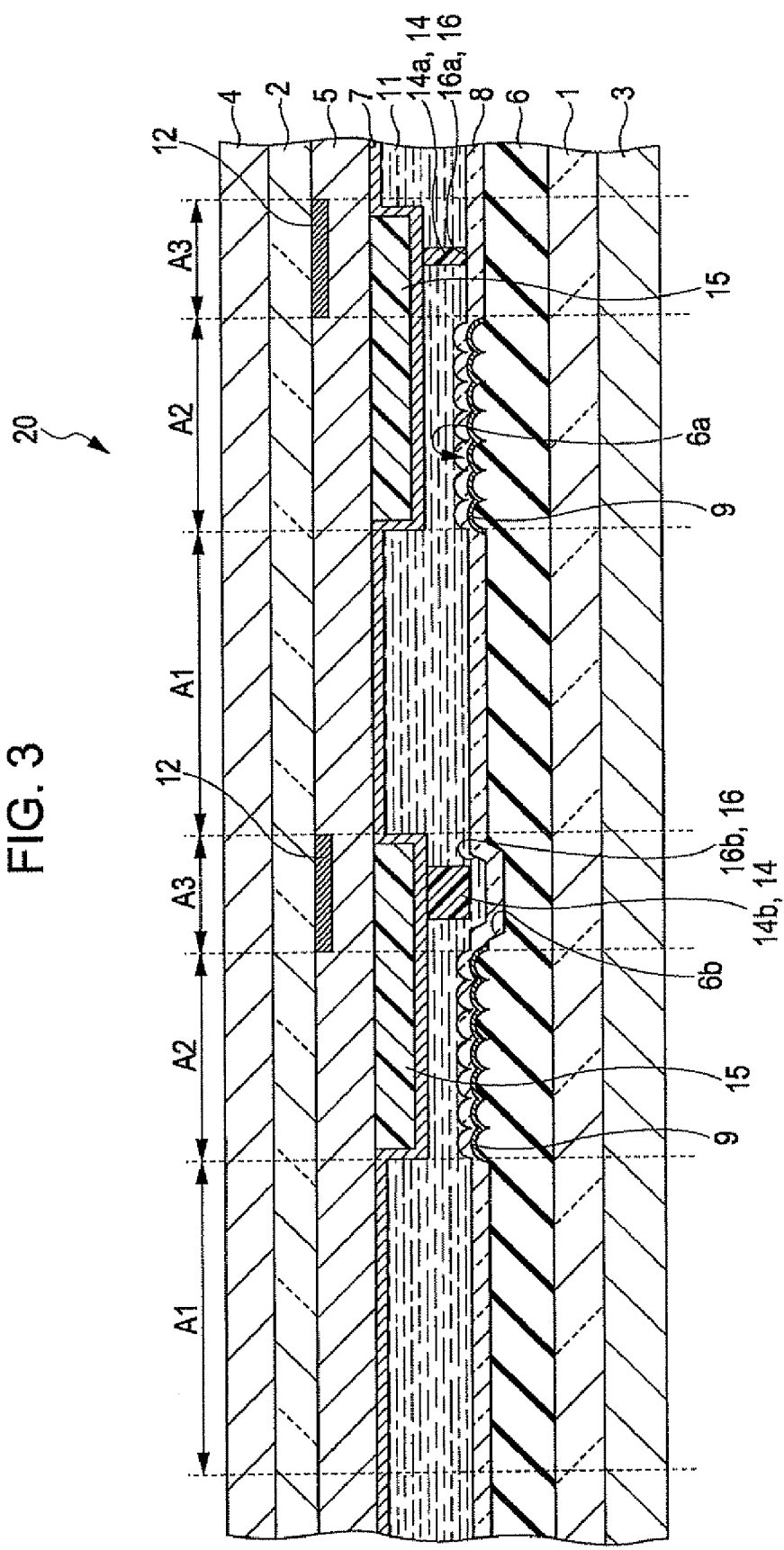
FIG. 3 is a schematic plan view showing another example of the liquid crystal device according to the invention.

Next, a liquid crystal device according to a second embodiment of the invention will be described. FIG. 3 is a schematic plan view showing another example of the liquid crystal device according to the invention. The liquid crystal device 20 of the present embodiment shown in FIG. 3 is similar to the liquid crystal device 10 shown in FIGS. 1 and 2 except the columnar spacers. Accordingly, in the liquid crystal device 20 shown in FIG. 3, the description of the same configuration as the liquid crystal device 10 shown in FIGS. 1 and 2 will be omitted or simplified.

In the liquid crystal device 20 shown in FIG. 3, the cross-sectional area of each of columnar spacers 14b which face the non-contact reception portions 16b is larger than that of each of columnar spacers 14a which face the contact reception portions 16a. Accordingly, in the liquid crystal device 20 shown in FIG. 3, the sum of the cross-sectional areas of the columnar spacers 14b which face the non-contact reception portions 16b is larger than that of the cross-sectional areas of the columnar spacers 14a which face the contact reception portions 16a.

In the liquid crystal device 20 shown in FIG. 3, since the cross-sectional area of each of the columnar spacers 14b which face the non-contact reception portions 16b is larger than that of each of the columnar spacers 14a which face the contact reception portions 16a, the surface pressing strength can be efficiently improved although the number of non-contact reception portions 16b is small. Since the columnar spacers 14a which face the contact reception portions 16a are susceptible to be deformed, the cell gap is more susceptible to be shrunk and thus the vacuum bubbles can be more efficiently prevented from being generated.

In the liquid crystal device 20 shown in FIG. 3, since the sum of the cross-sectional areas of the columnar spacers 14b which face the non-contact reception portions 16b is larger than that of the cross-sectional areas of the columnar spacers 14a which face the contact reception portions 16a, the cell gap is more susceptible to be shrunk and thus the vacuum bubbles can be more efficiently prevented from being generated.

The invention is not limited to the above-described embodiments.

For example, a ratio of the contact reception portions 16a and the non-contact reception portions 16b in the spacer reception portion 16 may be the same or may not be the same. In more detail, for example, three spacer reception portions 16 may include one contact reception portion 16a and two non-contact reception portions 16b. In this case, if the areas of the columnar spacers are the same, the sum of the cross-sectional areas of the columnar spacers which face the non-contact reception portions 16b is larger than that of the cross-sectional areas of the columnar spacers which face the contact reception portions 16*a*, and thus the vacuum bubbles can be more efficiently prevented from being generated.

For example, although the depths of the concave portions configuring the non-contact reception portions 16*b* are the same in all the non-contact reception portions 16*b*, the non-contact reception portions 16*b* may include first non-contact reception portions having a first depth and second non-contact reception portions having a second depth different from the first depth.

Although, in the above-described embodiments, the columnar spacers are arranged on the counter substrate 2 and the spacer reception portions 16 are arranged on the device substrate 1, the columnar spacers may be arranged on the device substrate 1 and the spacer reception portions may be arranged on the counter substrate 2.

Even in this case, it is possible to realize the liquid crystal device capable of preventing vacuum bubbles from being generated since the surface pressing strength is high.

Although, in the above-described embodiments, the columnar spacers 13*b* (14*b*) which face the non-contact reception portions 16*b* and the columnar spacers 13*a* (14*a*) which face the contact reception portions 16*a* are formed of the same material, the material of the columnar spacers 13*b* (14*b*) which face the non-contact reception portions 16*b* may be different from that of the columnar spacers 13*a* (14*a*) which face the contact reception portions 16*a*. If the material of the columnar spacers 13*b* (14*b*) which face the non-contact reception portions 16*b* may be different from that of the columnar spacers 13*a* (14*a*) which face the contact reception portions 16*a*, the surface pressing strength or the degree of the generation of the vacuum bubbles can be adjusted by properly selecting the materials of the columnar spacers and adjusting the buckling strength of the columnar spacers.

In more detail, for example, the columnar spacers 13*b* (14*b*) which face the non-contact reception portions 16*b* may be formed of a hard material, and the material of the columnar spacers 13*a* (14*a*) which face the contact reception portions 16*a* may be formed of a soft material compared with the columnar spacers 13*b* (14*b*). In this case, if the columnar spacers 13*a* (14*a*) which face the contact reception portions 16*a* and will be deformed by the shrinkage of the liquid crystal are formed of the soft material, the cell gap is susceptible to be shrunk and thus the vacuum bubbles can be efficiently prevented from being generated. When external force is applied to the liquid crystal device in the thickness direction, the columnar spacers 13*b* (14*b*) which face the non-contact reception portions 16*b* are brought into contact with the non-contact reception portions 16*b*. However, since the columnar spacers 13*b* (14*b*) which are brought into contact with the non-contact reception portions 16*b* are formed of the hard material, the surface pressing strength is high.

Although, in the above-described embodiments, each of the columnar spacers and each of the spacer reception portions 16 are provided in one pixel region 19 one by one, a plurality of columnar spacers and a plurality of spacer reception portions may be provided in one pixel region 19 or each of the columnar spacers and each of the spacer reception portions 16 may not be provided in the one pixel region 19.

The planar arrangement of the contact reception portions 16*a* (14*a*) and the non-contact reception portions 16*b* (14*b*) are not specially limited.

Although, in the above-described embodiments, the cross-sectional shape of the columnar spacers is circular, the shape of the columnar spacers is not specially limited. The planar shape of the non-contact reception portions 16*b* is not limited to the circular shape and rectangular shape may be used. The planar shape of the non-contact reception portions 16*b* may be equal to or different from the cross-sectional shape of the columnar spacers.

Electronic Apparatus

Next, an electronic apparatus including the above-described liquid crystal device will be described. This embodiment is an example of the invention and the invention is not limited to this embodiment.

Figure 4:
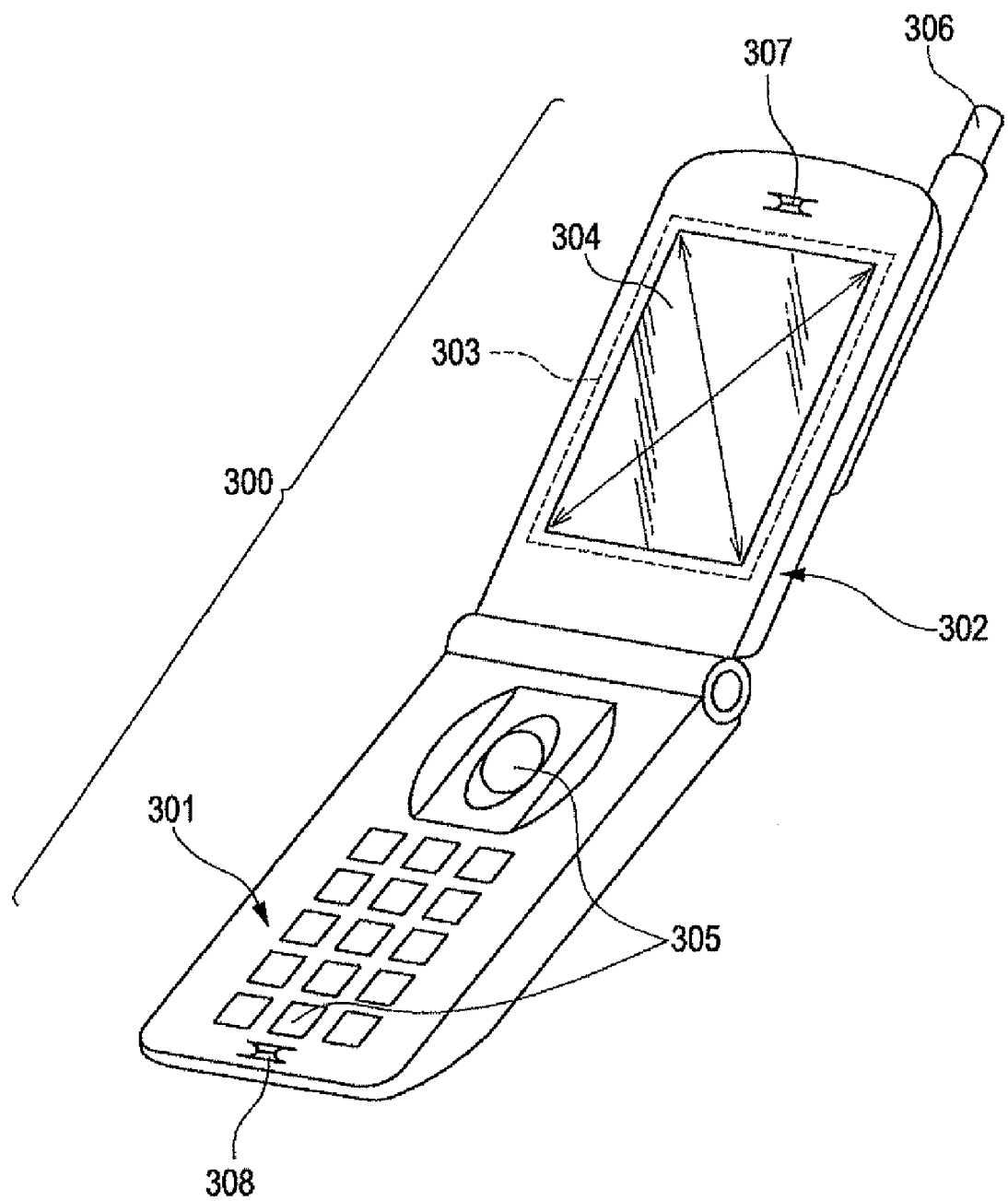
FIG. 4 is a perspective view showing the appearance of a mobile telephone which is an example of an electronic apparatus including the liquid crystal device of the invention.

FIG. 4 is a perspective view showing the appearance of a mobile telephone which is an example of an electronic apparatus including the liquid crystal device of the invention. As shown in FIG. 4, the mobile telephone 300 includes a main body 301, and a display body 302 which is openably and closably attached to the main body 301. A display device 303 is disposed in the display body 302 and various types of displays related to telephone communication are viewed on a display screen 304. Operation buttons 305 are arranged in the main body 301.

An antenna 306 is extendibly and contractibly mounted on one end of the display body 302. An earpiece 307 is provided on an upper side of the display body 302 and a mouthpiece 308 is provided on a lower side of the main body 301. The liquid crystal device of the invention is used in the display device 303.

According to the mobile telephone 300 of the present embodiment, the surface pressing strength is high and the vacuum bubbles can be prevented from being generated. Since the liquid crystal device of the invention capable of widening the optimal dripping amount range of the liquid crystal dripping at the time of forming the liquid crystal layer is included, high productivity and high reliability can be obtained.

The electronic apparatus including the liquid crystal device is not limited to the mobile telephone and is applicable to electronic apparatuses such as a personal computer, a notebook type personal computer, a workstation, a digital camera, a vehicle monitor, a car navigation system, a head-up display, a digital video camera, a television set, a viewfinder-type or direct-view monitor type video tape recorder, a pager, an electronic organizer, an electronic calculator, an electronic book or projector, a word processor, a videophone, a POS terminal and a touch-panel-equipped device.

The entire disclosure of Japanese Patent Application No. 2008-045600, filed Feb. 27, 2008 is expressly incorporated by reference herein.

What is claimed is:
1. A liquid crystal device, comprising:
a first substrate and a second substrate which face each other with a liquid crystal layer interposed therebetween;
a plurality of columnar spacers arranged on a surface of a liquid crystal layer side of the first surface, said columnar spacers maintaining a gap between the first substrate and the second substrate; and
a plurality of spacer reception portions arranged on a surface of a liquid crystal layer side of the second substrate in regions which face the columnar spacers;
wherein the plurality of spacer reception portions include contact reception portions which are in contact with the columnar spacers and concave non-contact reception portions which are not in contact with the columnar spacers, wherein the concave non-contact reception portions include a first concave non-contact reception portion having a first depth and a second concave non-contact reception portion having a second depth that is different from the first depth, and wherein the contact reception portions and the non-contact reception portions are alternately arranged in a checkerboard pattern.

2. The liquid crystal device according to claim 1, wherein the sum of the cross-sectional areas of the columnar spacers which face the concave non-contact reception portions is larger than that of the cross-sectional areas of the columnar spacers which face the contact reception portions.

3. The liquid crystal device according to claim 1, wherein the cross-sectional areas of the columnar spacers which face the concave non-contact reception portions are larger than those of the columnar spacers which face the contact reception portions.

4. An electronic apparatus comprising the liquid crystal device according to claim 1.

* * * * *